(12) United States Patent
Lee

(10) Patent No.: US 6,892,031 B2
(45) Date of Patent: May 10, 2005

(54) SIGNAL PROCESSING SYSTEM OF MULTIPLEXED FIBER BRAGG GRATING SENSOR USING CDMA

(76) Inventor: Ho-Joon Lee, 1-1702 Ssangyong Moran Apt., Ssangyong-dong, Cheonan-shi, Chungcheongnam-do, 330-090 (KR)

( * ) Notice: Subject to any disclaimer, the term of this patent is extended or adjusted under 35 U.S.C. 154(b) by 570 days.

(21) Appl. No.: 09/907,573

(22) Filed: Jul. 19, 2001

(65) Prior Publication Data

US 2002/0054408 A1 May 9, 2002

(30) Foreign Application Priority Data

Nov. 7, 2000 (KR) .......................................... 2000-65800

(51) Int. Cl.$^7$ ............................. H04J 4/00; H04J 14/02; H04J 14/08
(52) U.S. Cl. ............................... 398/78; 398/87; 398/99
(58) Field of Search .......................... 398/141, 99, 102, 398/87, 78, 98; 385/37, 12

(56) References Cited

U.S. PATENT DOCUMENTS

| | | | |
|---|---|---|---|
| 5,121,349 A | * | 6/1992 | Naito .......................... 708/252 |
| 5,397,891 A | | 3/1995 | Udd et al. ............. 250/227.18 |
| 5,426,297 A | * | 6/1995 | Dunphy et al. ........ 250/227.23 |
| H1626 H | * | 1/1997 | Kersey et al. .............. 370/479 |
| 5,889,901 A | * | 3/1999 | Anderson et al. ............. 385/12 |
| 6,208,773 B1 | * | 3/2001 | Wickham et al. ............. 385/10 |
| 6,285,806 B1 | * | 9/2001 | Kersey et al. ................ 385/12 |
| 6,356,684 B1 | * | 3/2002 | Patterson et al. ............. 385/37 |
| 6,447,959 B1 | * | 9/2002 | Erdogan et al. ................ 430/5 |
| 6,489,606 B1 | * | 12/2002 | Kersey et al. ......... 250/227.14 |
| 6,525,308 B1 | * | 2/2003 | Schmidt-Hattenberger ....... 250/227.23 |
| 6,573,489 B1 | * | 6/2003 | Johnson et al. ........ 250/227.14 |

OTHER PUBLICATIONS

DWDM of Fiber Bragg Grating Sensors Without Sensor Spectral Dynamic Range Limitation using CDMA, described in Code 5673, Naval Research Laboratory, Washington DC.

Optic Letters/ vol. 18, No. 16, Aug. 16, 1993 "Multiplexed fiber Bragg grating strain–sensor system with a fiber Fabry–Perot wavelength filter".

* cited by examiner

Primary Examiner—M. R. Sedighian
Assistant Examiner—Dalzid Singh
(74) Attorney, Agent, or Firm—Jacobson Holman PLLC

(57) ABSTRACT

A signal processing system of a multiplexed FBG sensor using CDMA includes a pseudo random bit sequences (PRBS) generator for generating pseudo random bit sequence; a LED for light-emitting at a pseudo random bit from the PRBS generator; a fiber coupler for transmitting a light signal from the LED into a FBG sensor portion and passing signals reflected by the FBG sensor portion herethrough; the FBG sensor portion for receiving/reflecting the light signal via an optic fiber to forward it back to the fiber coupler; an FBG filter portion for filtering the signal reflected by the FBG sensor portion and passed through the fiber coupler; photo detector for converting the light signal from the FBG filter portion into the electrical signal; a delaying portion for delaying a pseudo random bit signal from the PRBS generator for a predetermined time period; a mixing portion for mixing the delay signal from the delaying portion and the output signal from the photo detector; and at least one auto-correlation device for integrating or auto-correlating the signal from the mixing portion, thereby enhancing the stability of the system and the linearity of a signal to be measured to applied strain.

4 Claims, 5 Drawing Sheets

SIGNAL PROCESSING SYSTEM OF MULTIPLEXED FIBER BRAGG GRATING SENSOR USING CDMA

BACKGROUND OF THE INVENTION

The invention is related to providing a signal processing system of a multiplexed fiber Bragg grating sensor using a CDMA(Code Division Multiple Access), including a LED (Light Emitter Diode) as a light source and for enabling a CDMA approach for stabilizing a signal process thereto, thereby simplifying a system configuration.

PRIOR ART

A multiplexed fiber Bragg grating (FBG) sensor system with a fiber Fabry-Perot (FFP) filter can be operated either in a closed-loop tracking mode for use with a single sensor element or in a scanning mode for use with multiple sensors which is used to permit higher resolution to strain-induced shifts in the Bragg wavelengths of the sensor elements. The use of the FFP filter is to detect the wavelength shift of the fiber Bragg grating sensor or a network of sensor elements along a common fiber path, which is referred to Optic Letters/Vol. 18, No. 16/Aug. 15, 1993.

The single FBG sensor system includes one FBG sensor and a broadband source for generating light. The light from the broadband source is launched into the system. Then, the wavelength reflected by the single FBG sensor is directed via a coupler to a tunable FFP filter, which has a bandwidth comparable with that of the FBG and a free spectral range (FSR) larger than the operational wavelength domain of the GBGs. The narrow-pass band of the FFP filter is locked to the narrow-band FBG return signal with a simple feedback-loop arrangement to the tuning mechanism of the FFP, for example with piezoelectric adjustment of the cavity spacing. The arrangement includes a mixer for mixing a dithering signal of a predetermined frequency with the FFP signal and applies it to a low-pass filter to modulate the transmission wavelength of FFP. The modulation signal serving as an error signal is fed via an integrated circuit to the FFP tuning elements to lock the FFP passband wavelength to the Bragg wavelength of the sensor return signal. Therefore, the FFP control voltage is a measure of the mechanical or thermal perturbation of the FBG system.

Also, the operating of the FFP in the wavelength-scanning mode requires means for addressing several FBG elements, which are placed along a fiber path. The light reflected from the FBG array is directed to the FFP, which is swept in a wavelength by a control voltage used to adjust the mirror spacing. In this mode, the direct FBG sensor spectral returns are obtained from the photo detector output. If the dither signal is maintained, the photo detector signal is passed to an electrical mixer and lowpass filter that detects the components at the dither frequency. Therefore, the derivative response to the spectral components in the array output is obtained.

But, the FBG sensor system may have nonlinear wavelength response due to FFP tunable filter optics and the piezoelectric (PZT) element required by the FFP filter, the drifting and the instability from thermal coefficients of the FFP filter and other components, and overall wavelength measurement inaccuracy of several nanometers. The FBG sensor system may be supposed to cause an error due to a hysteresis of the PZT and determine its performance based on the scanning speed.

Recently, the FBG sensor system with a plurality of sensors adapts a CDMA approach which is based on correlation technique to separate out individual sensor signals from a single multiplexed signal of many sensors, which is referred to "DWDM of Fiber Bragg Grating Sensors Without Sensor Spectral Dynamic Range Limitation using CDMA" described in Code 5673, Naval Research Laboratory, Washington D.C. The CDMA process is continuous in time and can deliver stronger individual sensor signal power. The dense wavelength division multiple access (DWDMA) capability of the proposed CDMA approach is based on larger reduction of the wavelength separation between sensors, for example from a typical 3 nm to the fiber Bragg grating line width 0.3 nm without formation of Fabry-Perot cavities. The FBG sensor system comprises a pseudo random bit sequence (PRBS) and a plurality of FBG sensors in a predetermined array. In other words, two FBG sensors, which have 60% reflectivity and a grating line width of 0.3 nm at grating wavelengths of 1535.2 nm and 1535.5 nm respectively, are connected in series with a 100 meters fiber delay coil between them. A tunable laser (Photometic Tunic 1500) is intensity modulated in an on-off fashion using an electro-optic switch driven by the electronic PRBS of length 31 and 0.5 $\mu$s chip interval. The reflected signals from the FBG sensors are multiplexed by a time-shifted (one or more chip) the PRBS using a RF mixer. Two outputs are derived from the RF mixer, one corresponding to the correlation of the sensor output with a reference PRBS which is time-shifted with respect to the PRBS drive and the other corresponding to the correlation with the component of the time-shifted PRBS. By choosing the proper delay in the reference channel, auto-correlation with high value was obtained at the mixer output for one of the FBGSs while poor auto-correlation is obtained for the other FBG sensors. Taking the differential of these two outputs and lowpass filtering the differential, an output is obtained proportional to the low frequency (<chip rates of PRBS) response of a particular FBG sensor that is selected out. Strain induced wavelength shifts in each FBG sensor is determined by wavelength scanning of the tunable laser. Strain is applied on the FBG sensor via tension on the grating fiber using mechanical transitional stages on which the fiber grating is mounted. Spectral response of the decoded sensor output for different time-shifted reference PRBS and different strain levels is recorded for performance evaluation. Therefore, spectral outputs of different FBG sensors can be separated out from the multiplexed sensor array output by the auto-correlation process intrinsic to CDMA. Linear response in strain-induced spectral shifts from the individual FBG sensors can be measured by a wavelength tunable source without signal dynamic range limitation which require a specific sensor spectral separation.

But, it is known that the FBG sensor system adapts the high-priced tunable phonometic laser. And also, it would be limited by excess phase noise effects arising due to mixing of time coincident pulses from different sensors, and relatively high crosstalk between sensors.

In consideration of these points, it is preferable that a LED is used as a light source in a CDMA approach. More preferably, the good linear response characteristics are accomplished and the time-shifted outputs from different FBG sensors are assured by preventing the generating of the noise at a mixer and the crosstalk between them.

Accordingly, an object of the invention is to provide a signal processing system of a multiplexed fiber Bragg grating sensor which uses a LED (Light Emitter Diode) as a light source and adapts a CDMA approach to stabilize a signal process.

Another object of the invention is to provide a signal processing system of a multiplexed fiber Bragg grating sensor for processing the signals from a plurality of FBG sensors at an individual different frequency thereby to reduce the phase noise and crosstalk.

Another object of the invention is to provide a signal processing system of a multiplexed fiber Bragg grating sensor for enabling the measurement of a dynamic strain at a high speed.

SUMMARY OF THE INVENTION

According to the invention, a signal processing system of a multiplexed FBG sensor using CDMA comprises a pseudo random bit sequences (PRBS) generator for generating pseudo random bit sequence; a LED for light-emitting at a pseudo random bit from the PRBS generator; an optic coupler for launching a light signal from the LED into FBG sensor portion and passing signals reflected by the FBG sensor portion therethrough; the FBG sensor portion for receiving/reflecting the light signal via an optic fiber to forward it back to the optic coupler; an FBG filter portion for filtering the signal reflected by the FBG sensor portion and passed through the optic coupler; a photo detector for converting the light signal from the FBG filter portion into the electrical signal; a delaying portion for delaying a pseudo random bit signal from the PRBS generator for a predetermined time period; a mixing portion for mixing the delay signal from the delaying portion and the output signal from the photo detector; and at least one auto-correlation device for integrating or auto-correlating the signal from the mixing means.

The FBG sensor portion includes a fiber Bragg grating and/or a plurality of fiber Bragg grating sensors having different wavelengths, and the FBG filter portion includes a fiber Bragg grating and/or a plurality of fiber Bragg grating filters having different wavelengths, in which the FBG sensor and filter are used for measuring a small dynamic range, and the linearly chirped FBG sensor and FBG filter is used for measuring a larger dynamic ranger.

The time delay portion includes a plurality of delayers for delaying an output signal from the PRBS generator by a time that it takes to reflect the output signal at the FBG sensor portion and pass through the FBG filter portion and the photo detector; the mixing portion includes a plurality of mixers for mixing the output from the delayer with the output from the photo detector, in which the delayer and the mixer are constituted as an auto-correlation device to auto-correlate the signal reflected by the FBG sensor.

BRIEF DESCRIPTION OF THE DRAWINGS

FIGS. 1A and 1B are graphs illustrating the signal changing of a signal outputted from an integrator when a pressure is applied to an FBG sensor;

DETAILED DESCRIPTION OF THE INVENTION

Figure 1:
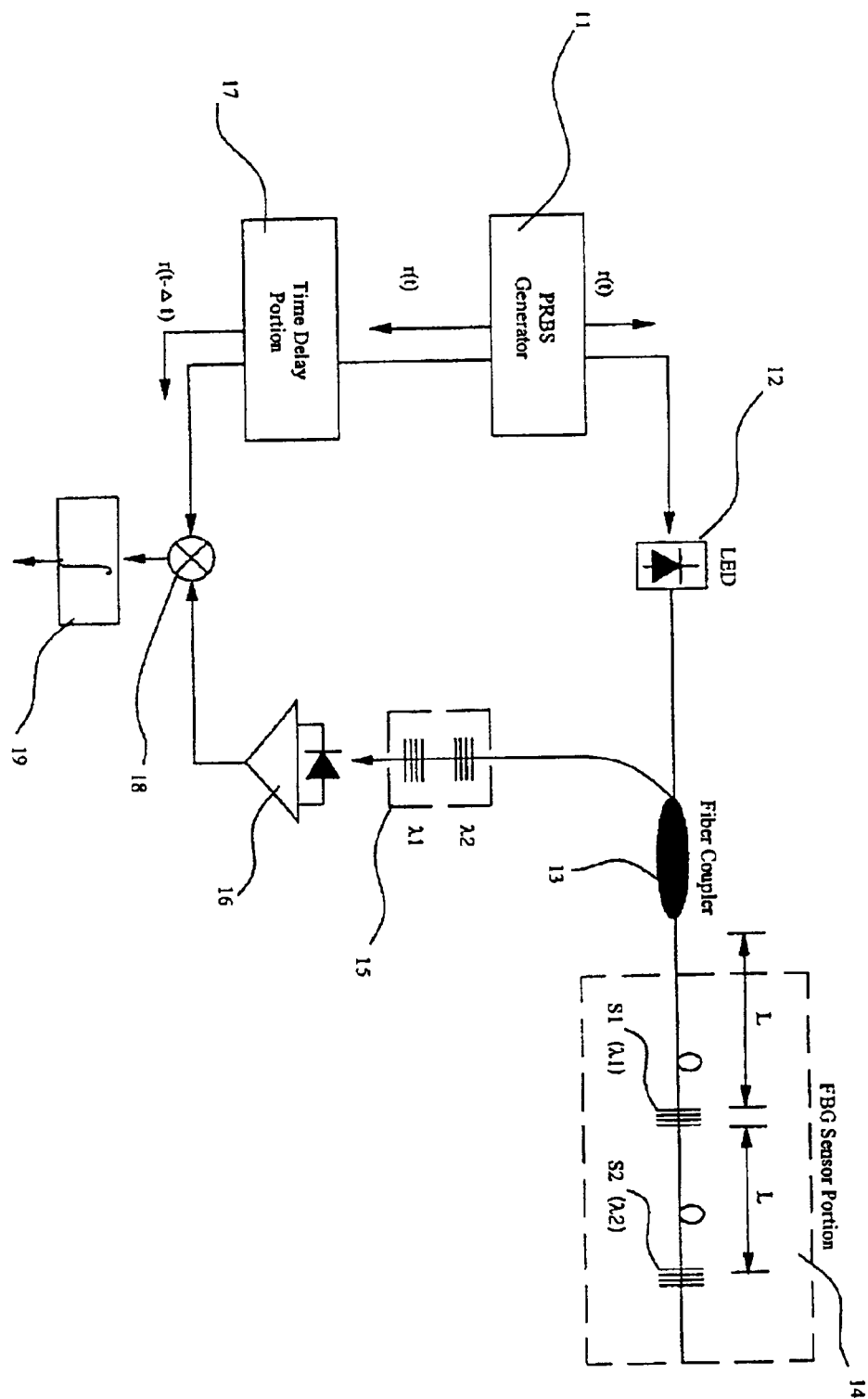
FIG. 1 is a conceptional block diagram illustrating a signal processing system of a multiplexed fiber Bragg grating sensor using CDMA for measuring a strain at a low speed according to the invention.

The invention now will be described in detail with reference to the accompanying drawings. FIG. 1 is a block diagram illustrating the configuration of a conceptional block diagram illustrating a signal processing system of a multiplexed FBG sensor using CDMA, in which the FBG sensor has 60% reflectivity and linewidth 1.5 nm.

As shown in FIG. 1, a PRBS generator 11 is supposed to generate a pseudo random bit signal having a sequence of a $2^n-1$ length by a n-stage shift register. The more the stage numbers of the shift register becomes, the longer the length of the pseudo random bit is obtained. In other words, as the length of the PRBS is increased, the number of the sensors is increased thereby to reduce the crosstalk. In this embodiment, an 8-stage linear feedback shift one (LFSRG) of four chips is used to allow an FBG sensor having above 100 Bragg grating resulting from $2^8-1(=255)$ to be adapted to the system.

A LED 12 is connected to the PRBS generator 11 to be turned on and off at a pseudo random bit. A fiber coupler 13 applies a light signal from the LED 12 to an FBG sensor portion 14 and launches light signals reflected from the FBG sensor portion 14 into an FBG filter portion 15. In other words, the FBG sensor portion 14 includes two first and second FBG sensors S1 and S2 connected in series to each other so as to receive the light signal via the fiber coupler 13 so as to filter the light signals that are reflected at the FBG sensors S1 and S2 and passed through the fiber coupler 13, each of which reflects the light signal to have different time delays due to a length L of an optical fiber. The FBG filter portion 15 includes two first and second FBG filters F1 and F2 connected in series to each other, each of which has the same bandwidth as that of 3dB which is a centre wavelength of the FBG sensors S1 and S2. Therefore, when the FBG sensors S1 and S2 remain without strain, their reflecting wavelengths are dependent upon those of the FBG filters F1 and F2, respectively. The signals reflected by the FBG sensors S1 and S2 are again reflected by the FBG filters F1 and F1. On the contrary, the FBG sensors S1 and S2 are remained under strain, the reflecting wavelengths of the FBG sensors S1 and S2 are transited and passed through the FBG filters F1 and F2.

A photo detector 16 is connected to the FBG filter portion 15 to convert the light signals therefrom into electrical signals. A time delay portion 17 delays a pseudo random bit signal from the PRBS generator 11 and outputs it to a mixer 18. The mixer 18 mixes the delayed signal from the time delay portion 17 and with the output signal from the photo detector 16. An integrator 19 integrates the signal from the mixer 18 to separate the reflecting signals of the FBG sensor portion 14 therefrom.

Therefore, the pseudo random bit signal generated at the PRBS generator 11 is transmitted into the LED 12 and the time delay portion 17 at the same time. The LED 12 emits the lights at the pseudo random bit and the lights are transmitted via the optical fiber into the fiber coupler 13. The light signal from the LED 12 is transmitted into the FBG sensor portion 14 which comprises first and second FBG sensors S1 and S2. The first and second FBG sensors S1 and S2 reflect the light signal at different wavelengths, respectively. For example, the first and second FBG sensors S1 and S2 are constituted as a Bragg grating for reflecting the wavelengths of 1309 nm and 1299 nm, respectively. The light signal transmitted into the fiber coupler 13 is reflected and forwarded back at corresponding wavelengths during passing through the first and second FBG sensors S1 and S2.

Figure 2A:
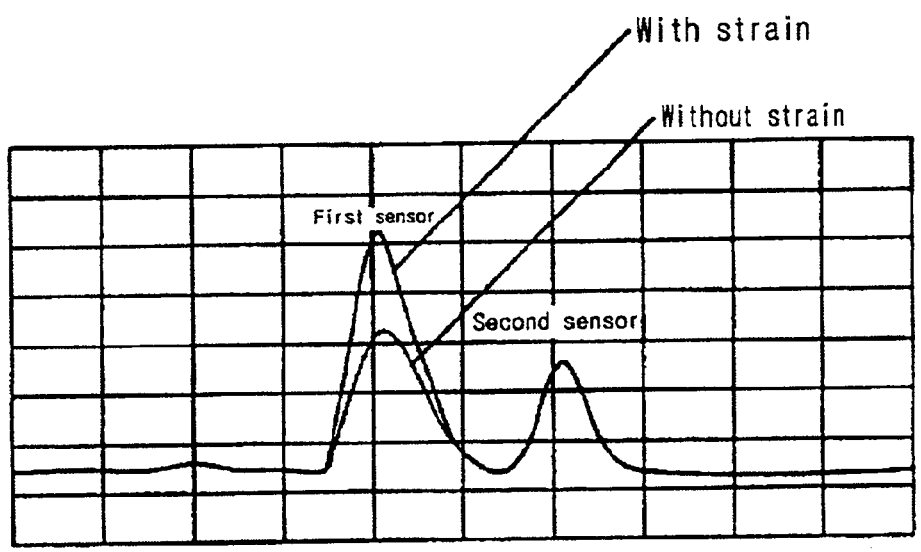
Figure 2B:
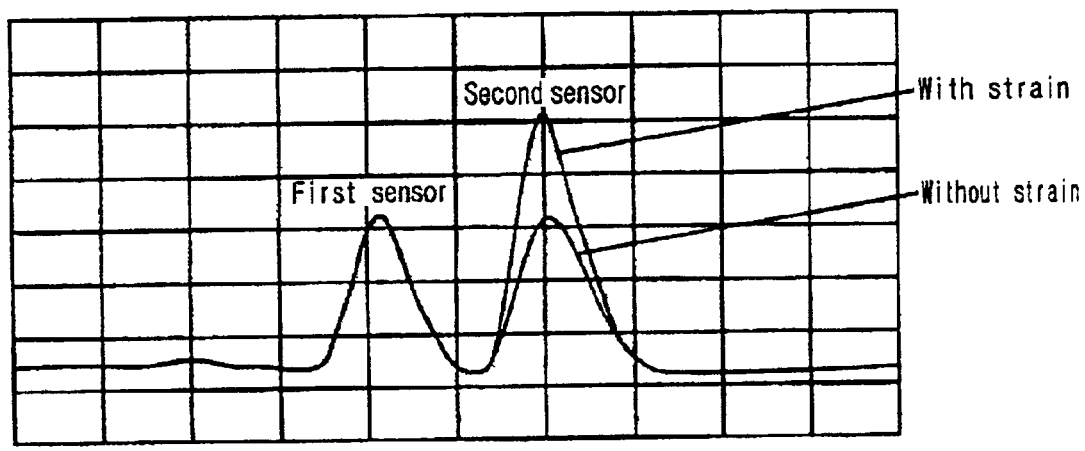

As shown in FIGS. 2A and 2B, the FBG sensors S1 and S2 are given the strain, selectively. FIG. 2A shows an output signal from the integrator 19, when the strain is applied or not applied to the first FBG sensor S1. When the first FBG sensor S1 is under the strain, the wavelength of the light signal reflected by the first FBG sensor S1 is changed. At this time, the intensity of the reflected signal via the FBG filter portion 15 is increased. The intensity of the light signal reflected by the second FBG sensor S2 is not changed, because the second FBG sensor S2 remains without the strain.

FIG. 2B shows an output signal from the integrator 19, when the strain is applied or not applied to the second FBG sensor S1. When the second FBG sensor S2 is under the strain, the wavelength of the light signal reflected by the second FBG sensor S2 is changed. At this time, the intensity of the reflected signal passing through the FBG filter portion 15 is increased. The intensity of the light signal reflected by the second FBG sensor S2 is not changed, because the second FBG sensor S2 remains without the strain.

The FBG filter portion 15 includes the first and second FBG filters F1 and F2 which are constituted as a wavelength depended optical filter such as an edge filter coated with a dielectric and long period grating etc., in which the optical filter transmits only a part of the light that is reflected by each of the FBG sensor S1 and S2 or changes a light intensity according to the change of the wavelength. The first FBG filter F1 reflects the same wavelength (1309 nm) as that of the first FBG sensor S1. The second FBG filter F2 reflects the same wavelength (1299 nm) as that of the second FBG sensor S2. Therefore, if any strain does not exist, there is not any output signal from the FBG filter portion 15. On the contrary, if any strain is applied to the FBG sensor portion 14, there occurs the transition at the wavelength of the signal reflected by the FBG sensor portion 14. The light signal of the wavelength reflected and transited by the FBG sensor S1 is passed through the FBG filter portion 15 and detected by the photo detector 16 including an optic diode to be converted into the electrical signal. The electrical signal is mixed with the delayed pseudo random bit signal from the PRBS generator 11 at the mixer 18. The integrator 19 auto-correlates the mixing signal to output outside.

As described above, if the first FBG sensor S1 is under the strain, the wavelength of the light signal reflected by the first FBG sensor S1 is changed, and the intensity of the light signal to be received via the FBG filter portion 15 is increased as shown in FIG. 2A. Similarly, if the second FBG sensor S2 is under the strain, the wavelength of the light signal reflected by the second FBG sensor S2 is changed, and the intensity of the light signal to be received via the FBG filter portion 15 is increased as shown in FIG. 2B.

Figure 3:
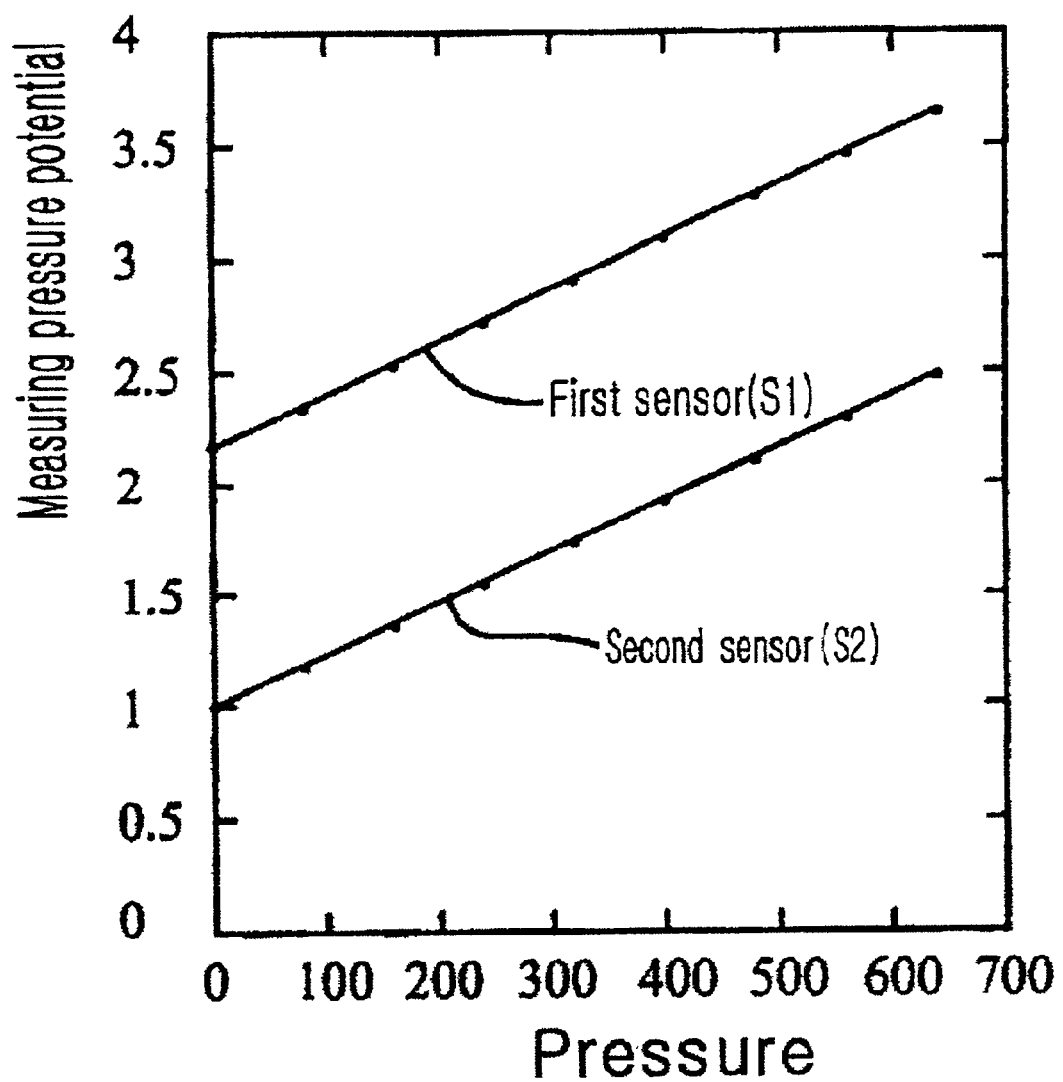
FIG. 3 is a graph illustrating an experimental result on the linearity of the output voltage from the integrator based on the pressure applied to the FBG sensor.

On the other hand, an experimental result illustrating the linearity of an output signal from the integrator 19 according to a strain applied to the FBG sensor portion 14 is shown in FIG. 3. In this drawing, a strain function is related to the maximum value of the output signals of the integrator 19 according to the change of a strain applied to each of first and second FBG sensors of FIG. 2. Herein, it is noted that the linearity response to the strain of 0–600 $\mu$ is observed. If the passband of the FBG sensor and the FBG filter are totally different from each other, the linearity disappears. If a linearly chirped fiber grating is used, a larger dynamic range is obtainable.

Figure 4:
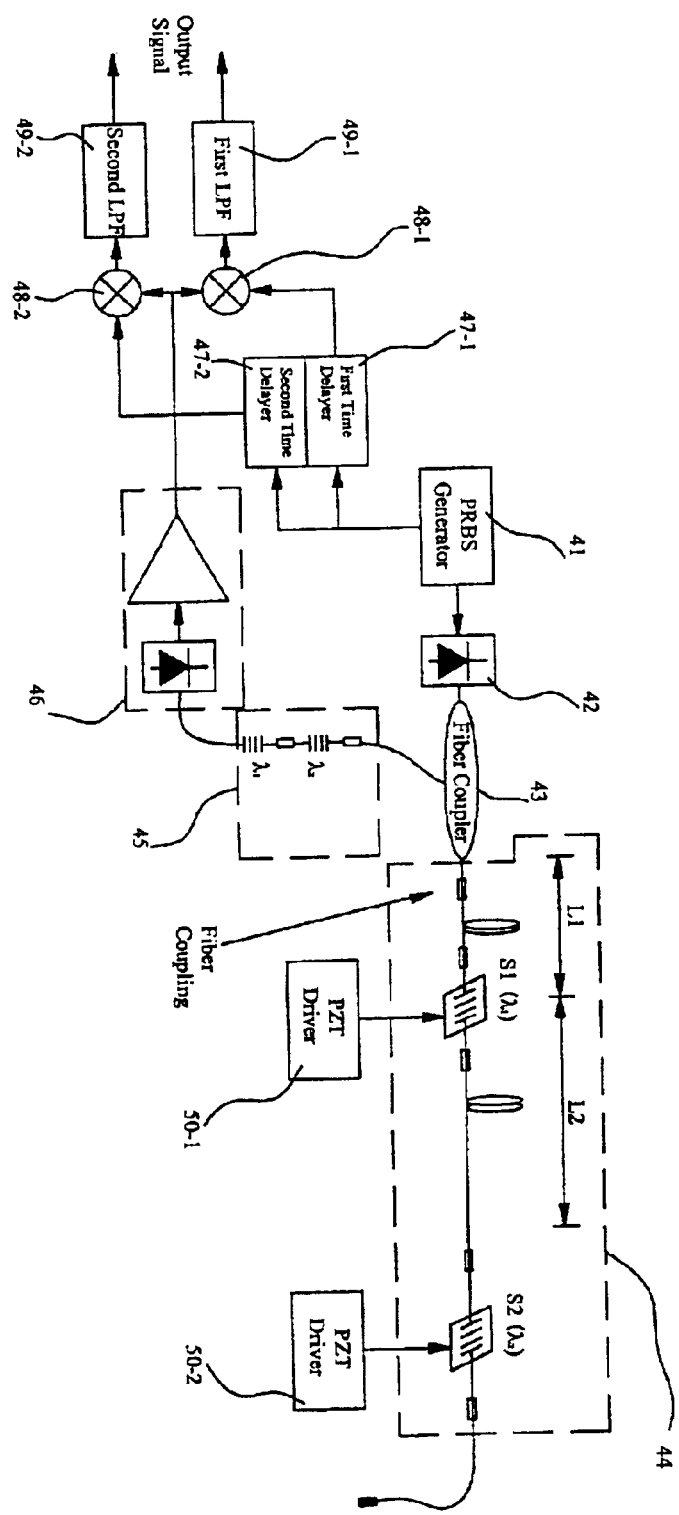
FIG. 4 is a conceptional block diagram illustrating a signal processing system of a multiplexed fiber Bragg grating sensor using CDMA for measuring a strain at a high speed according to the invention; and, FIGS. 5 and 6 are views illustrating the outputs of a piezoelectric element corresponding to each of first and second sensors and of the signal processing system; and, FIGS. 7 and 8 are graphs illustrating power spectrums of the signal processing system.

FIG. 4 is a block diagram of a signal processing system of a multiplexed FBG sensor system used in measuring a strain at a high speed. In order to apply a strain to an FBG sensor, piezoelectric element(PZT) drivers 50-1 and 50-2 are used. The PZT drivers 50-1 and 50-2 include a piezoelectric element (PZT) and an alternate current signal generating portion. The PZT is an element that a length is changed according to a voltage applied thereto and for applying a strain of a high speed to an FBG sensor. The alternate current signal generating portion generates an alternate current signal of a high voltage to apply it to the PZT, so that the PZT forces the high speed strain to be applied to the FBG sensors.

As the high speed strain is applied to the two FBG sensors, it is also applied to the pseudo random bit signals reflected at the FBG sensors, so that the pseudo random bit signals are changed. Therefore, the pseudo random bit signals reflected at the FBG sensors are auto-correlated with a time difference corresponding to the length optical fiber in order to be not overlapped to each other.

In other words, the pseudo random bit signal generated at a PRBS generator 41 is delayed at each of first and second time delayers 47-1 and 47-2 by a time that it takes for the pseudo random bit signals to be reflected at/returned from each of the FBG sensors. The delayed signals are transmitted into a first auto-correlation device including a first low pass filter 49-1 and a first mixer 48-1 and a second auto-correlation device including a second low pass filter 49-2 and a second mixer 48-2. The auto-correlation devices allow the signals reflected at each of the FBG sensor to be detected and the signals changed according to the strain applied to be displayed, respectively.

The PRBS generator 41 includes eight shift registers like a device used in measuring a low speed strain with a maximum length of 255 bit and generates a pseudo random bit signal with a bit period of 50 ns. A LED 42 generates a light signal of 1550 nm modulated at a pseudo random bit sequence generator. The light signal is transmitted into a first FBG sensor S1 and a second FBG sensor S2 connected in series to each other passing through an fiber coupler 43. Then, the first and second FBG sensors S1 and S2 reflect the signals modulated by the PZT drivers 50-1 and 50-2. The signals modulated are filtered at an FBG filter portion 45 including first and second filters F1 and F2 and then detected by a light detector 46. Herein, it is noted that the first FBG sensor S1 and the first FBG filter F1 are constituted as a chirped optic fiber Bragg grating having similar characteristics of a center wavelength of 1534 nm. The second FBG sensor S2 and the second FBG filter F2 are constituted as a chirped optic fiber Bragg grating having a center wavelength of 1549 nm.

Therefore, the signals detected by the photo detector 46 via the FBG sensor portion 44 and the FBG filter portion 46 are transmitted into the first and second mixers 47-1 and 47-2 at the same time. The first and second mixers 47-1 and 47-2 mix the detected signal with the signals delayed by the first and second fixed time delayers 47-1 and 47-2 for delaying the pseudo random bit signal to be exactly synchronized at the modulated signal and output the mixed signal to the lowpass filters 49-1 and 49-2, respectively. In other words, the detected signals and delayed signals are auto-corelated by the first and second auto-correlation devices. Herein, it is noted that the delay time caused by the first time delayer 47-1 is the same as that of the signal that is reflected/forwarded by the first FBG sensor S1, and the delay time caused by the second time delayer 47-2 is the same as that of the signal that is reflected/forwarded by the second FBG sensor S2. Therefore, the output of the first lowpass filter 49-1 shows a signal changed according to the strain applied to the first FBG sensor S1, and the output of the second lowpass filter 49-2 shows a signal changed according to the strain applied to the first FBG sensor S2.

Figure 5:
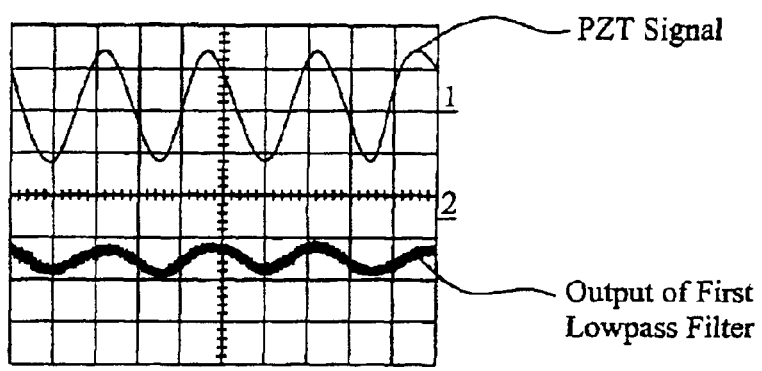
Figure 6:
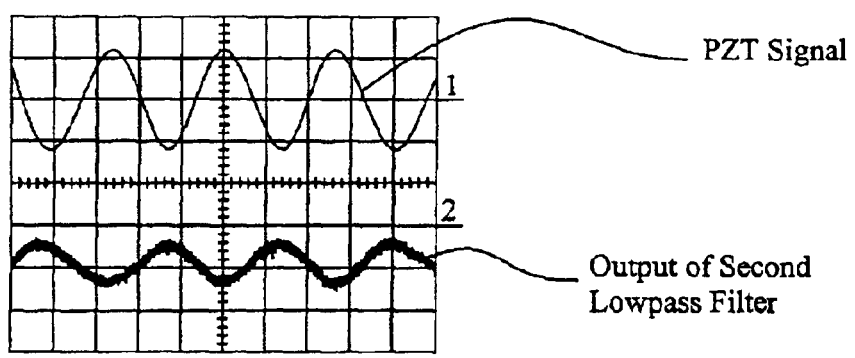

FIGS. 5 and 6 show the outputs of the PZT drivers corresponding to each of the first and second FBG sensors and the resulting outputs of a signal processing system according to the invention in order. In order to obtain these experimental results, an output voltage of the PZT driver is set at AC 60 $V_{P-P}$, and an output frequency is set to be equal to a resonant frequency of each of the PZT, for example the first FBG sensor S1 is set at 800 Hz, and the second FBG sensor S2 is set at 740 Hz. It is known from the drawings that even through there is a little distortion due to a phase difference and a noise between an applied voltage and an output of the PZT driver a vibrating signal applied to the PZT is sufficiently restored.

Figure 7:
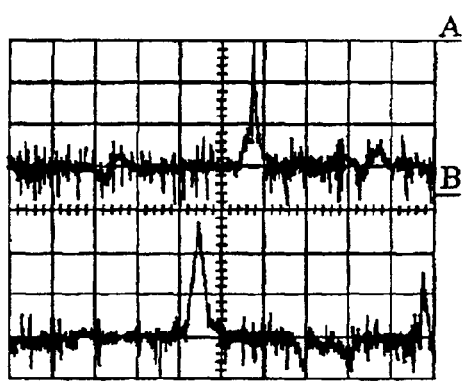

FIG. 7 shows power spectrums with respect to the outputs of FIGS. 5 and 6. As it is apparent from the figure, the frequency component of 800 Hz that the first FBG sensor S1 outputs appear the strongest output signal from the first lowpass filter 49-1, and the frequency component of 740 Hz that the second FBG sensor S2 outputs is the strongest output signal from the first lowpass filter 49-2. A crosstalk between the two multiplexed FBG sensors is measured below −30 dB. Herein, it is noted that the signals from the multiplexed FBG sensors are successfully separated from each other.

As described above, a signal processing system of an FBG sensor system effectively separates the signals between multiplexed FBG sensors using CDMA technology, enables the center wavelength of the sensors to be measured using an FBG. The signal processing system can be constructed as a lower priced stable system without using an FFP filter and a tunable laser. Also, the signal processing system can measure the signals of the multiplexed FBG sensor by scanning a time delay and enhances the linearity to applied strain.

What is claimed is:

1. A signal processing system of a multiplexed FBG sensor system with a plurality of FBG sensors using CDMA, the signal processing system comprising:

a pseudo random bit sequence (PRBS) generator for generating pseudo random bit sequence connected to a LED for light-emitting at a pseudo random bit from the PRBS generator to generate light signals;

a fiber coupler connected to the LED and for transmitting light signals from the LED into an FBG sensor portion and passing signals reflected by the FBG sensor portion therethrough;

the FBG sensor portion including at least two FBG sensors for receiving launched light signals and reflecting them at different Bragg wavelengths via an optic fiber to forward it back to the fiber coupler, in which the FBG sensors have a wavelength different from each other;

an FBG filter portion including at least two FBG filters which have a Bragg wavelength different from each other, which is connected to the fiber coupler, and for filtering the light signals reflected by the FBG sensor portion and passed through the fiber coupler, in which the FBG filter portion is constituted as fiber Bragg gratings at least two FBGs along with the fiber; and a photo detector for converting the light signal from the FBG filter portion into the electrical signal, at least one delaying portion for delaying a pseudo random bit signal from the PRBS generator for a predetermined time period, and a mixing portion for mixing the delay signal from the scanning delaying portion and the output signal from the photo detector and at least one auto-correlation device for integrating or auto-correlating the signal from the mixing portion.

2. The signal processing system of a multiplexed FBG sensor system with a plurality of FBG sensors using CDMA as claimed in claim 1, wherein the FBG sensor portion includes a fiber Bragg grating and/or a plurality of fiber Bragg grating sensors having different wavelengths, and the FBG filter portion includes a fiber Bragg grating and/or a plurality of fiber Bragg grating filters having different wavelengths, in which the FBG sensor and filter are used for measuring a small dynamic range, and a linearly chirped FBG sensor and filters are used for measuring a larger dynamic range.

3. The signal processing system of a multiplexed FBG sensor system with a plurality of FBG sensors using CDMA as claimed in claim 1, wherein the time delay portion includes a plurality of time delayers for delaying an output signal from the PRBS generator by a time that it takes to reflect the output signal at the FBG sensor portion and pass through the FBG filter portion and the photo detector, the mixing portion includes a plurality of mixers for mixing the output from the fixed time delayer and the output from the photo detector, in which the auto-correlation device includes the delay and the mixer to auto-correlate the signal reflected by the FBG sensor.

4. The signal processing system of a multiplexed FBG sensor system with a plurality of FBG sensors using CDMA as claimed in claim 1, wherein a plurality of FBG filters is constituted as a fiber Bragg grating having the same wavelength as that of the signal reflected by the FBG sensor, which is a wavelength depended filter including an edging filter coated with a dielectric for changing the light intensity according to the change of the wavelength or a long period optical fiber Bragg grating.

* * * * *